(12) United States Patent
Kaye et al.

(10) Patent No.: US 9,940,563 B2
(45) Date of Patent: Apr. 10, 2018

(54) SYSTEMS AND METHODS FOR PRESERVING AND MANAGING DOCUMENT CHAIN OF CUSTODY

(71) Applicant: FUJI XEROX CO., LTD., Tokyo (JP)

(72) Inventors: John Edward Kaye, Newberg, OR (US); Russell Shane Neville, Portland, OR (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/824,036

(22) Filed: Aug. 11, 2015

(65) Prior Publication Data
US 2017/0046604 A1    Feb. 16, 2017

(51) Int. Cl.
*G06K 15/00* (2006.01)
*H04N 1/44* (2006.01)
(Continued)

(52) U.S. Cl.
CPC ..... *G06K 15/4095* (2013.01); *G06K 15/4005* (2013.01); *H04N 1/32133* (2013.01);
(Continued)

(58) Field of Classification Search
CPC .......... G06K 25/4095; G06K 25/4005; G06K 7/10198; G06K 7/10237; G06K 7/1227; G06K 7/10207; G06K 15/4095; G06K 15/4005; G06F 3/1219; G06F 3/1239; G06F 3/1258; G06F 3/1205; G06F 3/1222; H04N 1/00347; H04N 1/00838; H04N 1/00973; H04N 1/32133; H04N 1/4426;
(Continued)

(56) References Cited

U.S. PATENT DOCUMENTS 7,653,185 B2 *  1/2010  Rebert ............... H04L 67/327
                                                379/100.01
8,677,507 B2 *  3/2014  Ginter .................. G06F 21/10
                                                380/231
(Continued)

FOREIGN PATENT DOCUMENTS

JP       2002149371       5/2002

*Primary Examiner* — Gabriel Garcia
(74) *Attorney, Agent, or Firm* — TransPacific Law Group; Pavel I. Pogodin, Esq.

(57) ABSTRACT

A computerized system for preserving and managing an audit trail associated with printing of a sensitive document, the system including: a printing device disposed on a local area network; a network-connected appliance disposed on the local area network and communicatively coupled to the printing device, the network-connected appliance configured to receive a request from a client system for printing of the sensitive document, to log information related to the received printing request and to release the sensitive document to the printing device for printing; and a server disposed outside of the local area network and configured to receive from the network-connected appliance the logged information related to the printing request and to aggregate and store the logged information on a storage device for subsequent search and retrieval. The computerized system additionally implements the enforcement side of improper document handling and enables identifications of the user(s) who mishandled the specific document(s).

22 Claims, 7 Drawing Sheets

(51) Int. Cl.
*H04N 1/32* (2006.01)
*G06F 3/12* (2006.01)

(52) U.S. Cl.
CPC ... *H04N 1/4426* (2013.01); *H04N 2201/3202* (2013.01); *H04N 2201/3269* (2013.01); *H04N 2201/3276* (2013.01)

(58) Field of Classification Search
CPC ... H04N 2201/3202; H04N 2201/3269; H04N 2201/3276
USPC ...... 358/1.1, 1.13, 1.14, 1.15, 402; 709/203, 709/205, 208, 209; 727/17
See application file for complete search history.

(56) References Cited

U.S. PATENT DOCUMENTS

| | | | |
|---|---|---|---|
| 2006/0279772 A1* | 12/2006 | Ludwig | G06F 21/608 358/1.15 |
| 2010/0220355 A1* | 9/2010 | Sugiyama | G06F 3/1203 358/1.15 |
| 2012/0030187 A1* | 2/2012 | Marano | G06F 21/6218 707/709 |
| 2012/0079571 A1* | 3/2012 | Evan | G06F 21/6209 726/6 |
| 2013/0335785 A1* | 12/2013 | Qi | G06F 3/1222 358/3.28 |

* cited by examiner

SYSTEMS AND METHODS FOR PRESERVING AND MANAGING DOCUMENT CHAIN OF CUSTODY

BACKGROUND OF THE INVENTION

Technical Field

The disclosed embodiments relate in general to secure document management systems and methods and, more specifically, to systems and methods for preserving and managing an audit trail associated with printing of sensitive documents. The disclosed embodiments also relate to the enforcement side of improper document handling and identifying the user(s) who mishandled the specific document(s).

Description of the Related Art

In most business settings, there are always documents, which contain sensitive business information, such as know-how, trade secrets, employee records, etc. Accidental or malicious disclosure of the contents of these sensitive documents to unauthorized persons can be extremely harmful to the business. Additionally, there are some industries in which document contents are regulated by law, such as the health care industry. For example, an accidental disclosure of patient information contained in a document can result in imposition of fines and/or other sanctions.

On the other hand, as would be appreciated by persons of ordinary skill in the art, the ability to track and monitor a document from its origination (usually in electronic form) to the point at which it is printed on paper has been very limited. In small businesses and businesses with remote satellite offices, it has also been difficult to later demonstrate compliance with secure document handling standards or gather secure document handling information from remote sites.

As would be appreciated by persons of skill in the art, in view of the aforesaid shortcomings of the conventional secure document management technology, it would be advantageous to have new and improved systems and methods for preserving and managing an audit trail associated with printing of sensitive documents.

SUMMARY OF THE INVENTION

The embodiments described herein are directed to methods and systems that substantially obviate one or more of the above and other problems associated with conventional secure document management techniques.

In accordance with one aspect of the inventive concepts described herein, there is provided a computerized system for preserving and managing an audit trail associated with printing of a sensitive document, the system incorporating: a printing device disposed on a local area network; a network-connected appliance disposed on the local area network and communicatively coupled to the printing device, the network-connected appliance configured to receive a request from a client system for printing of the sensitive document, to log information related to the received printing request and to release the sensitive document to the printing device for printing; and a server disposed outside of the local area network and configured to receive from the network-connected appliance the logged information related to the printing request and to aggregate and store the logged information on a storage device for subsequent search and retrieval.

In one or more embodiments, the server is further configured to receive logged information related to printing of sensitive documents from a plurality of network-connected appliances disposed on a plurality of different and distinct local area networks.

In one or more embodiments, the server is further configured to generate a graphical user interface for searching and retrieval of the logged information related to the printing requests.

In one or more embodiments, the server further comprises a web server portion and wherein the graphical user interface for searching and retrieval of the logged information related to the printing requests is a web user interface generated using the web server portion of the server.

In one or more embodiments, the graphical user interface comprises a search portion for searching logged information related to printing requests related to a specified user.

In one or more embodiments, the graphical user interface comprises a search portion for searching logged information related to printing requests related to a specified user location.

In one or more embodiments, the graphical user interface comprises a search portion for searching logged information related to printing requests related to a specified request date and time.

In one or more embodiments, the network-connected appliance further comprises a print server portion configured to handle the received printing request.

In one or more embodiments, the server is a cloud-based server.

In one or more embodiments, the network-connected appliance is further configured to encode the sensitive document with a serialized document code before releasing the sensitive document to the printing device for printing.

In one or more embodiments, the serialized document code is a bar code.

In one or more embodiments, the serialized document code is a QR-code.

In one or more embodiments, the serialized document code is a steganographic code encoded within the body of the sensitive document.

In one or more embodiments, the serialized document code is encoded using a character alignment, size, angle of rotation or spacing within the body of the sensitive document.

In one or more embodiments, the information related to the received printing request comprises identity of an end user who initiated the printing request.

In one or more embodiments, the information related to the received printing request comprises location of an end user who initiated the printing request.

In one or more embodiments, the information related to the received printing request comprises date and time when the printing request was initiated.

In one or more embodiments, the information related to the received printing request comprises identity of the sensitive document.

In one or more embodiments, the information related to the received printing request comprises identity of the sensitive document.

In one or more embodiments, the network-connected appliance further comprises a smart card reader configured to read information encoded on a smart card inserted by an end user and wherein the network-connected appliance is further configured to authenticate the end user based on the read information.

In accordance with another aspect of the inventive concepts described herein, there is provided a computer-implemented method for preserving and managing an audit trail associated with printing of a sensitive document, the method being performed in a computerized system comprising a printing device disposed on a local area network, a network-connected appliance disposed on the local area network and communicatively coupled to the printing device and a server disposed outside of the local area network, the method involving: receiving, at the network-connected appliance disposed on the local area network, a request from a client system for printing of the sensitive document; logging, at the network-connected appliance, information related to the received printing request; releasing, by the network-connected appliance, the sensitive document to the printing device for printing; transmitting the logged information related to the received printing request from the network-connected appliance to the server disposed outside of the local area network; and aggregating and storing, by the server, the transmitted logged information on a storage device for subsequent search and retrieval.

In accordance with yet another aspect of the inventive concepts described herein, there is provided a non-transitory computer-readable medium embodying a set of computer-executable instructions, which, when executed in connection with a computerized system comprising a printing device disposed on a local area network, a network-connected appliance disposed on the local area network and communicatively coupled to the printing device and a server disposed outside of the local area network, cause the computerized system to perform a method involving: receiving, at the network-connected appliance disposed on the local area network, a request from a client system for printing of the sensitive document; logging, at the network-connected appliance, information related to the received printing request; releasing, by the network-connected appliance, the sensitive document to the printing device for printing; transmitting the logged information related to the received printing request from the network-connected appliance to the server disposed outside of the local area network; and aggregating and storing, by the server, the transmitted logged information on a storage device for subsequent search and retrieval.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

To address the above and other problems associated with the conventional technology, one or more embodiments described herein implement computerized systems and computer-implemented methods for preserving and managing an audit trail associated with printing of sensitive documents. In various embodiments, the described systems and methods monitor and record when, where and by whom a specific sensitive document is printed. That comprehensive audit trail may be stored in a cloud storage system and made accessible to an end user via a web portal user interface for review and search of the logged audit information and for audit report generation.

Specifically, in accordance with one aspect of the inventive techniques, there is provided a computerized appliance-based cloud connected solution for preserving and managing an audit trail associated with printing of sensitive documents. The described one or more embodiments of the systems and methods solve the well-known problems of demonstrating compliance of secure document handling with the established security protocols and procedures as well as legal requirements.

Figure 1:
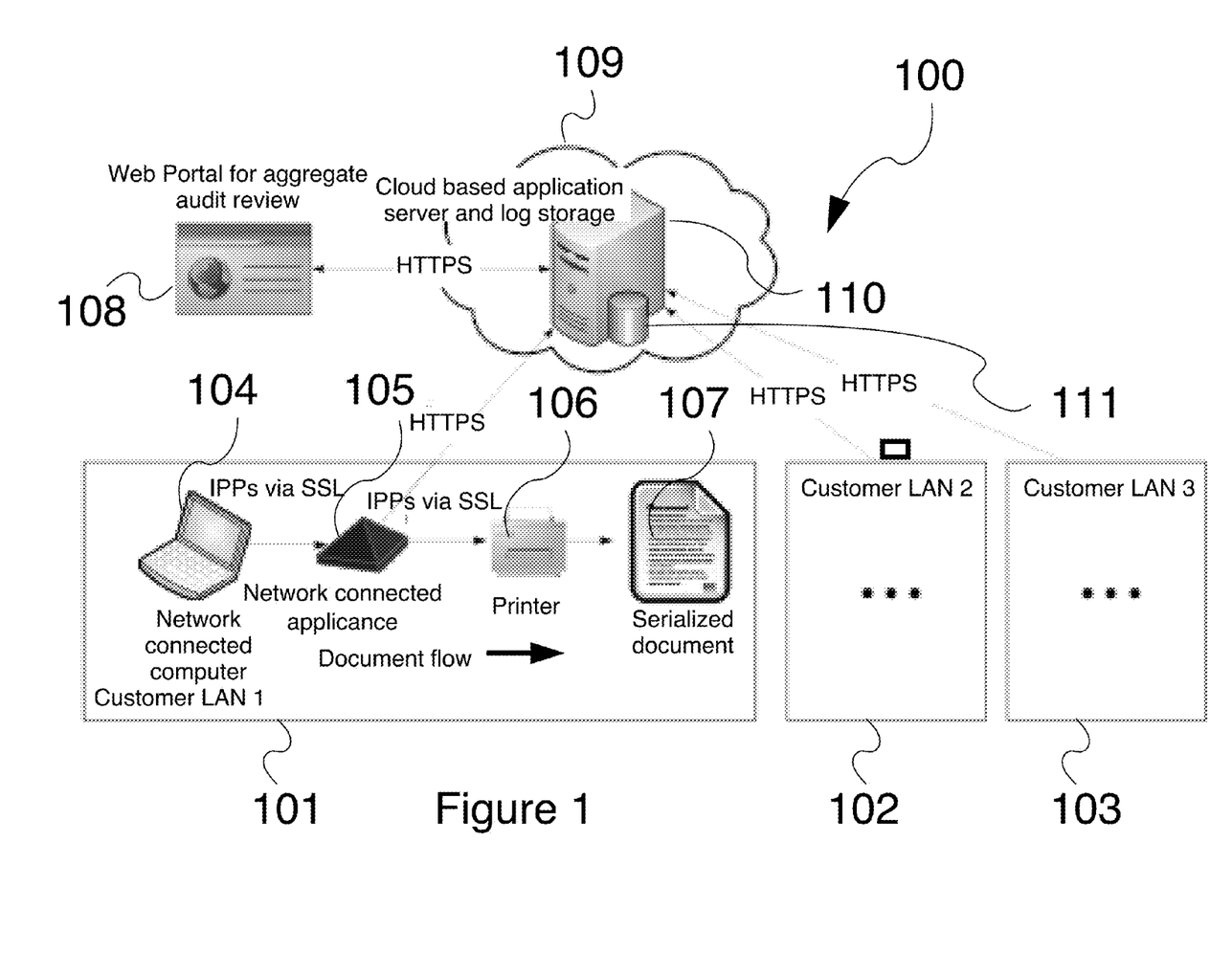
FIG. 1 illustrates a logical diagram of an exemplary embodiment of a system for preserving and managing an audit trail associated with printing of sensitive documents.

FIG. 1 illustrates a logical diagram of an exemplary embodiment of a computerized system 100 for preserving and managing an audit trail associated with printing of sensitive documents. In one or more embodiments, the system 100 shown in FIG. 1 includes a network connected computer system 104 communicatively connected to a local area network 101, from which an end user wishes to print a sensitive document in a secure manner. The printing of the sensitive document is performed using a printer 106, which generates a serialized sensitive document 107.

In one or more embodiments, one or more core functions of the aforesaid system 100 are performed by a network connected appliance 105 shown in FIG. 1. In one or more embodiments, the aforesaid network connected appliance 105 is configured to enable the secure document handling and the audit capability for tracking document chain of custody. In various embodiments, the network connected appliance 105 may include: an embedded web server configured to provide an interface for any browser on the same network; an embedded application for logging and communicating with the cloud server; an embedded print server; a local secure storage for storing documents; and a card or other computer media reader module for smart card release of documents to the print device 106. In one or more embodiments, users of the computerized system 100 for preserving and managing an audit trail associated with printing of sensitive documents may include end users who print the documents and administrative users who subsequently locate and review the corresponding printing audit trail. Administrative users possess special login credentials, which identify such users as administrative users to the computerized system 100.

In one or more embodiments, the system 100 for preserving and managing an audit trail associated with printing of sensitive documents may further incorporate or use a server 110 disposed in the cloud 109. In one or more embodiments, the server 110 executes a cloud server-based application and a database management system (database engine). In various embodiments, the database management system may be implemented based on any now known or later developed type of database management system, such as a relational database management system, including, without limitation, MySQL, Oracle, SQL Server, DB2, SQL Anywhere, PostgreSQL, SQLite, Firebird, redis, MongoDB, Hadoop and/or MaxDB, which are well-known to persons of skill in the art. In an alternative embodiment, a cloud-based distributed database, such as Amazon Relational Database Service (Amazon RDS), well known to persons of ordinary skill in the art, may also be used in place of the dedicated database management system.

The server 110 may be communicatively coupled with attached or networked data storage 111 for storing various information, including, without limitation, any client logged information and audit data relating to printed sensitive documents. In one or more embodiments, the server 110 may further execute a web server for generating a web portal user interface for enabling an administrator to access the audit trail information for printed sensitive documents and for generating audit reports. By way of example and not limitation, the web server may be implemented using Apache web server, Microsoft Windows Server, Sun web server, Google web server, and/or Nginx web server, all of which are well known to persons of ordinary skill in the art, or any other suitable now known or later developed web server product.

In one or more embodiments, the administrator accesses the web portal user interface using one or more web browsers 108 executing on local or remote computing devices.

In one or more embodiments, the server-based application is configured to communicate, via a data network, with one or more network connected appliances 105 located on one or more local area networks 101, 102 and 103, to gather the data from these appliances and to store the collected data using the aforesaid database management system. The server-based application, in conjunction with the aforesaid web server, generates a web portal user interface for querying the logged information stored by the database management system. In various embodiments, the stored data may be queried using a wide variety of conditions, constraints and other criteria. Exemplary types of queries include queries by printing device 106, by end user client device (network connected computer) 104, by business location of the end user or printing event and by identity of the end user of the system, who initiated the printing of one or more of the sensitive documents.

Figure 2:
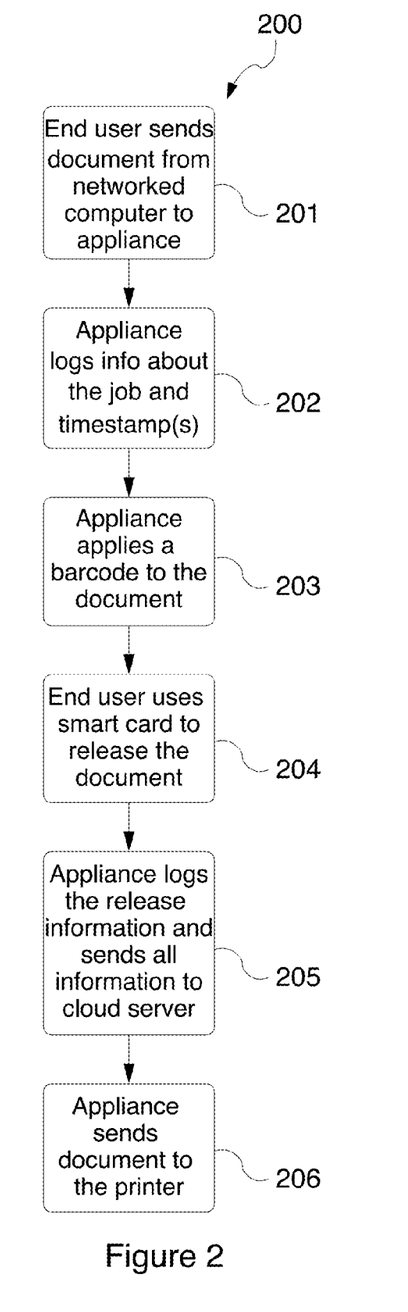
FIG. 2 illustrates an exemplary block diagram of an embodiment of a document chain of custody management process performed in connection with the computerized system for preserving and managing an audit trail associated with printing of sensitive documents shown in FIG. 1.

FIG. 2 illustrates an exemplary block diagram of an embodiment of a document chain of custody management process 200 performed in connection with the computerized system 100 for preserving and managing an audit trail associated with printing of sensitive documents shown in FIG. 1. As shown in FIG. 2 at step 201, the end user sends the document from a network connected computer 104 securely to a network connected appliance's 105 print server via a secure print protocol. At step 202, the network connected appliance 105 logs the identity of the end user who initiated (submitted) the job, the title of the sensitive document, the file format of the sensitive document, its size and number of pages and a timestamp including current date and time information.

At step 203, the network connected appliance 105 applies a serialized document code to the secure document. In various embodiments, the aforesaid serialized document code may be implemented, for example, as a numeral or other alphanumeric code placed in the header or footer or other location of the sensitive document. In an alternative embodiment, a machine-readable serialized document code, such as a barcode or QR-code may be placed in the header or footer or other location of the sensitive document. In yet alternative embodiment, the aforesaid serialized document code may be a number or an alphanumeric string encoded into the document text itself using various known techniques, such a steganographic techniques well known to persons of ordinary skill in the art. For example, the serialized document code may be encoded using subtle variations in document character alignment, size, angle of rotation or spacing within the body of the document itself. Such subtle variations would not be easily apparent to a human reader, but could be easily detected using image analysis software and the serialized document code may be derived therefrom. In addition, removal of so encoded serialized document code may be difficult as it would require detection and correction of the aforesaid subtle variations. Moreover, as would be appreciated by persons of ordinary skill in the art, many other ways for applying the serialized document code to the sensitive document may be used and, therefore, the techniques described herein are not limited to any such specific method or particular technique.

At step 204, the end user who initiated the printing of the sensitive document walks to the network connected appliance 105, which may be proximate to the print device 106 and uses a smart card reader or other secure proximity device to tap to the network connected appliance 105 and release the document to the print device 106. In response to the detection of the smart card or other secure proximity device, the network connected appliance 105 is configured to release the sensitive document to the printing device. In an alternative embodiment, the reader or other proximity device is external to the network connected appliance 105. In that case, the reader or proximity device would be connected via the network-connected appliance's USB port and the above document release workflow would be the same.

At step 205, the network connected appliance 105 logs the release of the sensitive document by the end user to the printing device 106 along with the timestamp and the serialized document code described above. In the same step 205, the network connected appliance 105 transmits all the logged information to the cloud based server application deployed on the aforesaid server 110. This logged data transmission operation may be performed based on predetermined time intervals. Upon the receipt of the transmitted logged information, the cloud based server application deployed on the aforesaid server 110 stores the received logged information in one or more database tables stored in the storage 111 under the management of the aforesaid database management system.

At step 206, the network connected appliance 105 transmits the sensitive document to the printing device 106, which prints the sensitive document in the printed paper form 107. After that, the end user retrieves the paper copy of the sensitive document with the applied serialized document code.

Figure 3:
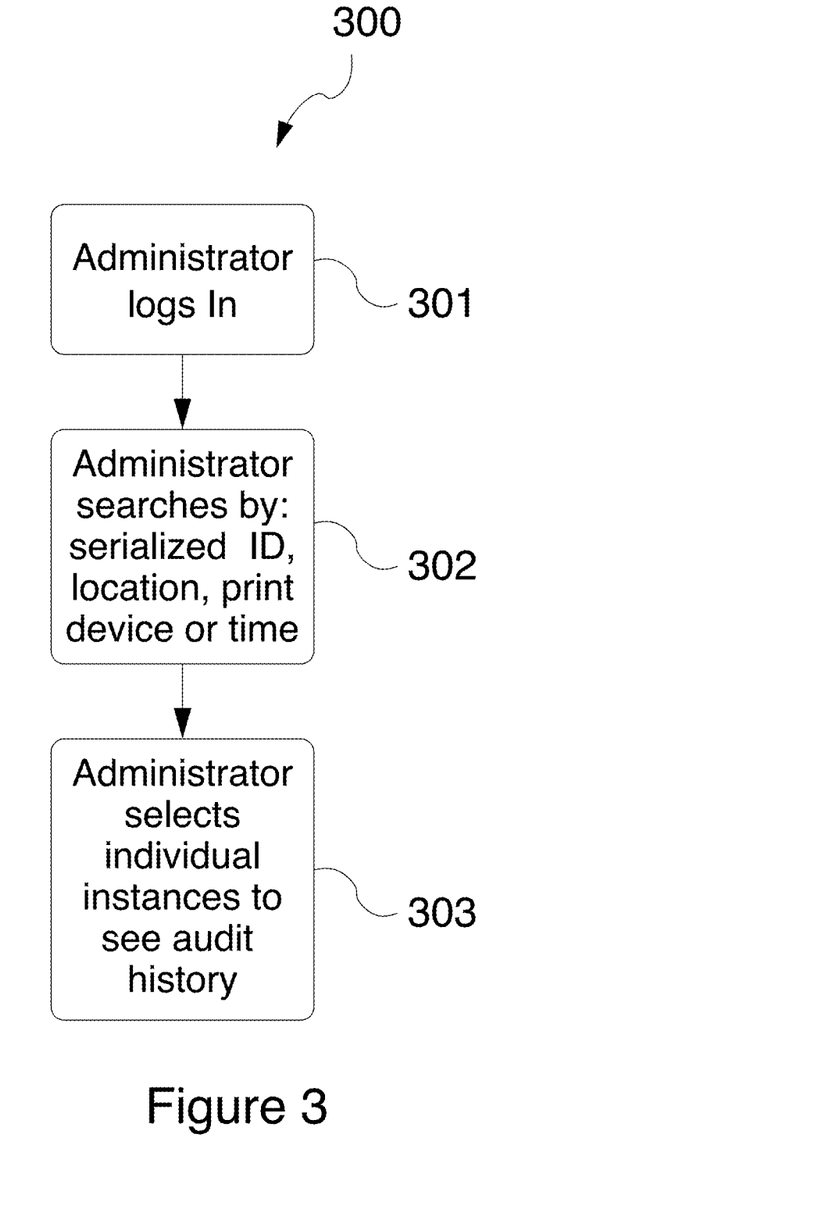
FIG. 3 illustrates an exemplary block diagram of an embodiment of a printed sensitive document audit data view process performed in connection with the computerized system for preserving and managing an audit trail associated with printing of sensitive documents shown in FIG. 1.

FIG. 3 illustrates an exemplary block diagram of an embodiment of a printed sensitive document audit data view process 300 performed in connection with the computerized system 100 for preserving and managing an audit trail associated with printing of sensitive documents shown in FIG. 1. First, at step 301, an administrative user who wishes to view the printed sensitive document audit information securely logs into the web portal interface portion of the cloud server-based application using his or her secure login credentials. At step 302, the administrative user is enabled to perform searches for a particular printed sensitive document based, for example, on the aforesaid serialized document code applied to the document, the identity of the end user initiating the printing, the user location, the printing device and/or the timeframe. It should be noted that may other search options may be available to the administrative user or he or she may simply browse the logged information.

At step 303, the administrative user selects a particular search result or entry to see the full audit history associated with the selected item captured by the network connected appliance 105. In one or more embodiments, in the case of verifying a printed copy of the sensitive document, the serialized document code applied to the document may be read and checked against the information logged by the system 100. In one embodiment, based on the serialized document code, the identity of the user who initiated the printing of the document may be determined by the system using the information logged by the system 100. In various embodiments, the system displays information on the identity of the user who initiated printing of the sensitive document, the date and time when the document was printed, the identity of the device from which the printing request has been initiated, the identity of the printing device as well as the corresponding timestamp.

Figure 4:
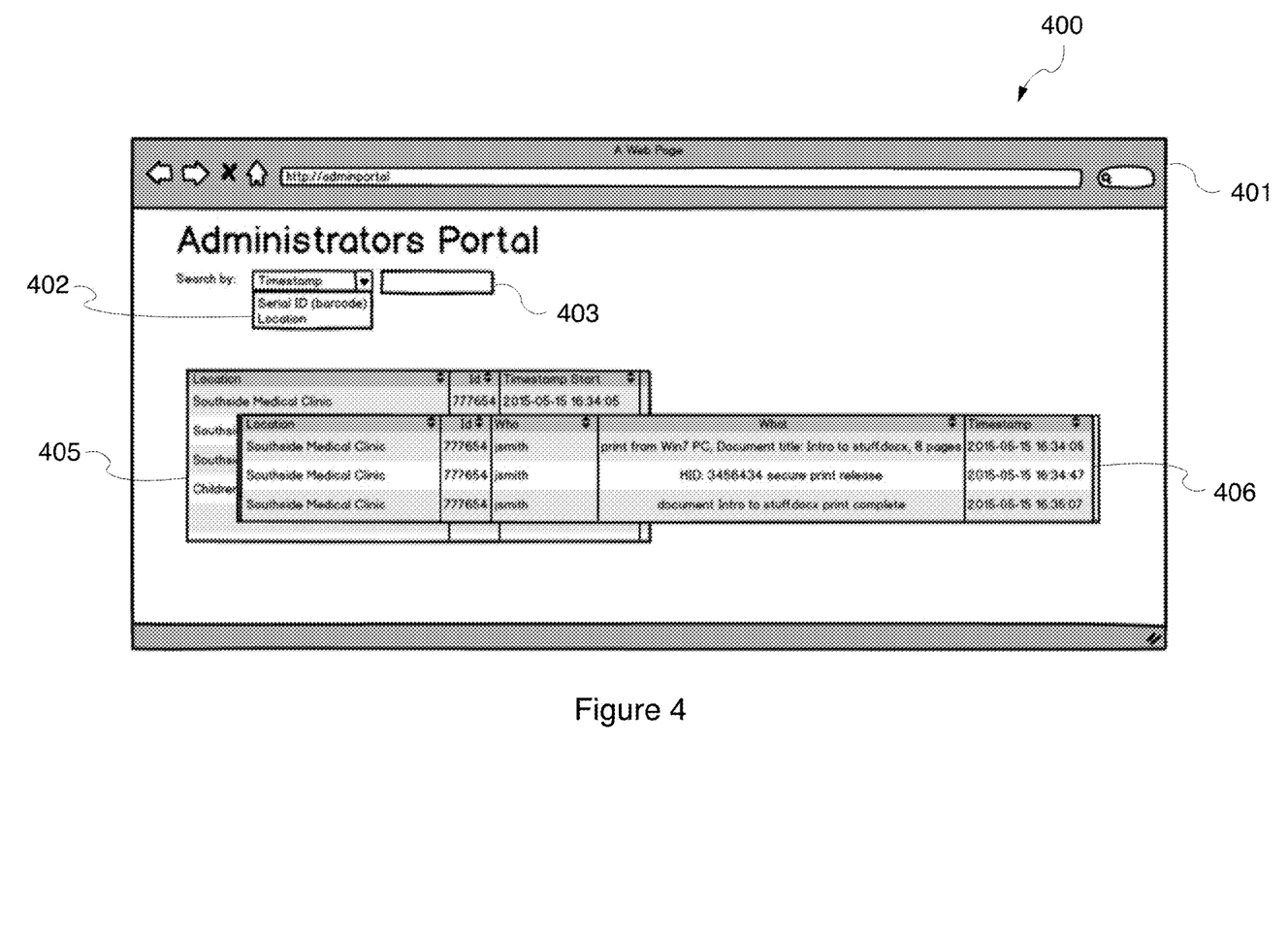
FIG. 4 illustrates an exemplary embodiment of a web portal user interface used by an administrative user for searching and reviewing printed sensitive document audit data.

FIG. 4 illustrates an exemplary embodiment of a web portal user interface 400 used by an administrative user for searching and reviewing printed sensitive document audit data. Such web portal user interface may be used, for example, in connection with the process illustrated in FIG. 3. In one embodiment, the web portal user interface 400 is viewed by the administrative user as a web page 401 displayed in a web browser executing on the administrative user's client computing device.

In one or more embodiments, the web portal user interface 400 incorporates a search field selection widget 402 for selecting a search field, including, without limitation, the aforesaid serialized document code applied to the document, the identity of the end user initiating the printing, the end user location, the printing device and/or the timeframe. In addition, the query input field 403 may be provided for receiving one or more search terms from the administrative user, see step 302 in FIG. 3. The search results generated in response to the query issued by the administrative user may be displayed to the user using the search results display portion 405 of the web portal user interface 400, as shown in FIG. 4. Finally, the detailed audit data in response to selection by the administrative user of one or more search results may be displayed to the administrative user in the audit data display portion 406 of the user interface 400. The information displayed in the audit data display portion 406 may include, without limitation, the information on the identity of the user who initiated printing of the sensitive document, the date and time when the document was printed, the identity of the device from which the printing request has been initiated, the identity of the printing device as well as the corresponding timestamp, see step 303 in FIG. 3.

Figure 5:
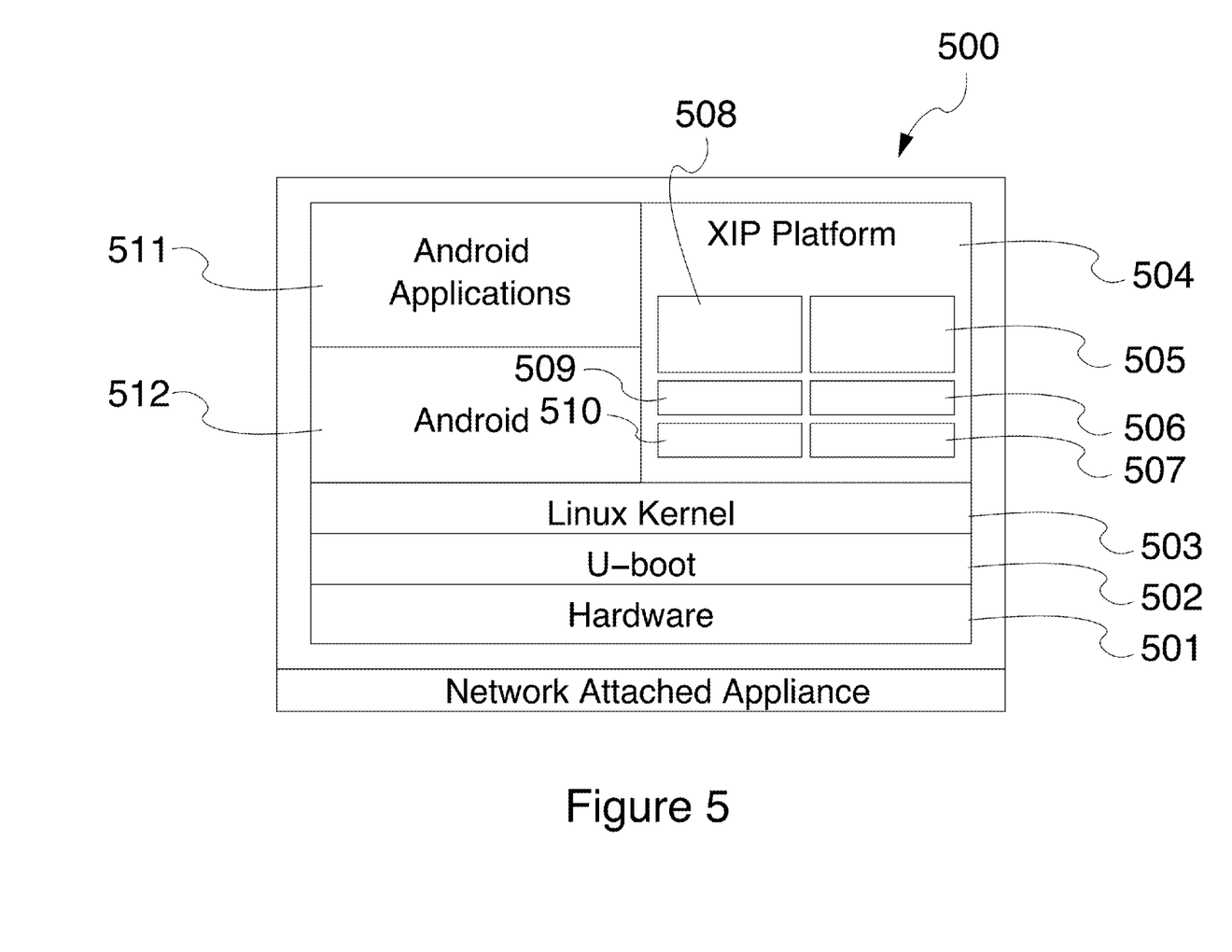
FIG. 5 illustrates an exemplary block diagram of an embodiment of the network connected appliance described herein.

FIG. 5 illustrates an exemplary block diagram of an embodiment 500 of the network connected appliance 105 described herein. In one embodiment, the network connected appliance 105 is deployed on a hardware platform 501, which may be a standard commercially available computerized system, described below. The embodiment 500 of the network connected appliance 105 may further incorporate a U-boot system 502 (Universal Bootloader), which is a boot loader used by the network connected appliance 105 to boot the device's operating system kernel, such as the Linux Kernel 503. The Linux Kernel 503 implements basic system services and manages various hardware components of the aforesaid embodiment 500 of the network connected appliance 105. The software application stack of the aforesaid embodiment 500 of the network connected appliance 105 includes XIP platform 504, which includes various embedded applications, including the aforesaid embedded print server, logging system 506 for logging the sensitive document printing data described in detail above, an embedded web server 507, cloud communication proxy 508 for communicating with the cloud server 110, a device discovery module 509 for identifying various devices, such as printing devices 106, on the local area network 101-103 and embedded document services 510 enabling the end user to initiate the printing of the documents. Additionally provided may be Android operating environment 512 well known to persons of ordinary skill in the art as well as custom Android applications 511. In various embodiments, the network connected appliance 105 is configured to automatically determine the status of the document as a sensitive document and to perform the logging operations described above only if the document has been determined to be sensitive. On the other hand, no logging is performed if the document is not sensitive.

It would be noted that in various embodiments, one or more functions and/or operations described above in connection with a specific component of the computerized system 100, such as the appliance 105 or the server 110, may be performed by another suitable component of the computerized system 100. For example, the one or more functions and/or operations of the appliance 105 may be performed by the server 110 and vise versa. The same is true with respect to the remaining components of the computerized system 100. Thus, the invention is not limited by particular system component(s) which perform one or more of the described functions and/or operations and performance or such functions and/or operations may be suitable distributed among various components of the described systems without departing from the scope and spirit of the invention.

Computing Platforms

Figure 6:
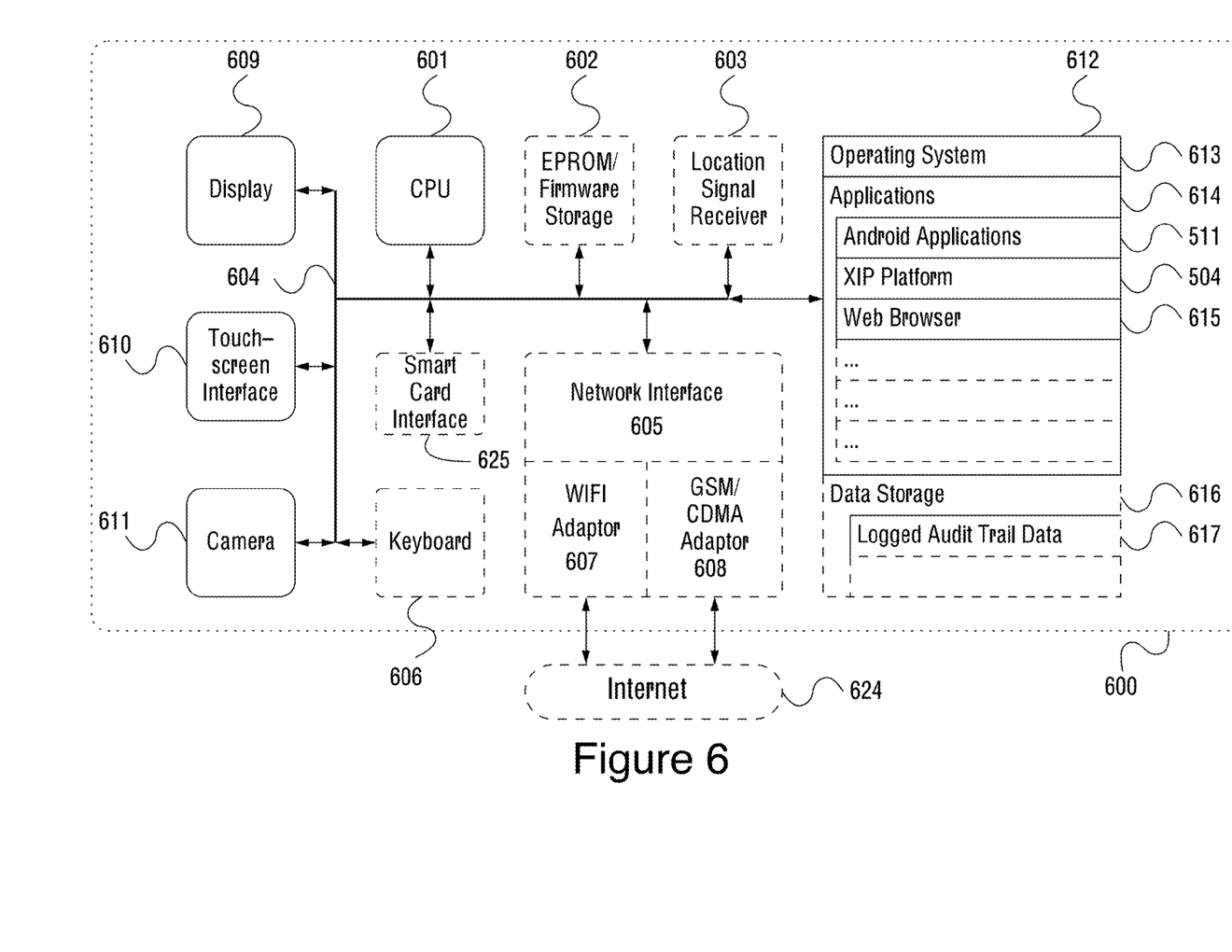
FIG. 6 illustrates an exemplary embodiment of a computerized system that could be used as the user's network connected computer or the network connected appliance in connection with the system for preserving and managing an audit trail associated with printing of sensitive documents shown in FIG. 1.

FIG. 6 illustrates an exemplary embodiment of a computerized system 600 that could be used as the user's network connected computer 104 or the network connected appliance 105 in connection with the system 100 for preserving and managing an audit trail associated with printing of sensitive documents shown in FIG. 1. In one or more embodiments, the computerized system 600 may be implemented within a form factor of a mobile computing device, such as a smartphone, a personal digital assistant (PDA), a tablet computer, or a smart watch. In an alternative embodiment, the computerized system 600 may be implemented based on a laptop, a notebook or a desktop computer. Yet in an alternative embodiment, the computerized system 600 may be an embedded system, incorporated into an electronic device with certain specialized functions, such as an electronic book (or e-book) reader, scanner or copier. Yet in an alternative embodiment, the computerized system 600 may be implemented as a part of an augmented reality head-mounted display (HMD) systems, such as Google glass, also well known to persons of ordinary skill in the art.

The computerized system 600 may include a data bus 604 or other interconnect or communication mechanism for communicating information across and among various hardware components of the computerized system 600, and a central processing unit (CPU or simply processor) 601 coupled with the data bus 604 for processing information and performing other computational and control tasks. Computerized system 600 also includes a memory 612, such as a random access memory (RAM) or other dynamic storage device, coupled to the data bus 604 for storing various information as well as instructions to be executed by the processor 601. The memory 612 may also include persistent storage devices, such as a magnetic disk, optical disk, solid-state flash memory device or other non-volatile solid-state storage devices.

In one or more embodiments, the memory 612 may also be used for storing temporary variables or other intermediate information during execution of instructions by the processor 601. Optionally, computerized system 600 may further include a read only memory (ROM or EPROM) 602 or other static storage device coupled to the data bus 604 for storing static information and instructions for the processor 601, such as firmware necessary for the operation of the computerized system 600, basic input-output system (BIOS), as well as various configuration parameters of the computerized system 600.

In one or more embodiments, the computerized system 600 may incorporate a display device 609, which may be also coupled to the data bus 604, for displaying various information to a user of the computerized system 600, such as the graphical user interface screen 400 shown in FIG. 4. In an alternative embodiment, the display device 609 may be associated with a graphics controller and/or graphics processor (not shown). The display device 609 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 609 may be incorporated into the same general enclosure with the remaining components of the computerized system 600. In an alternative embodiment, the display device 609 may be positioned outside of such enclosure.

In one or more embodiments, the computerized system 600 may further incorporate a smart card interface 625 connected to the data bus 604 and configured to read information encoded on a smart card inserted by the end user. This encoded information may contain end users' credentials.

In one or more embodiments, the computerized system 600 may incorporate one or more input devices, such as a touchscreen interface 610 for receiving tactile commands, a camera 611 for acquiring still images and video of various objects, as well as a keyboard 606, which all may be coupled to the aforesaid data bus 604 for communicating information, including, without limitation, images and video, as well as user command selections to the processor 601. In an alternative embodiment, input devices may include a system for tracking eye movements of the user (not shown), which may be used to indicate to the computerized system 600 the command selection by the user. In yet alternative embodiment, the computerized system 600 may incorporate a voice command interface for receiving voice control commands from the user.

In one or more embodiments, the computerized system 600 may additionally include a location signal receiver 603 configured to perform scan for GPS signal(s), determine the geographical location of the computerized system 600 based on the detected GPS signal(s) and communicate the determined geographical location information to the processor 601 via the data bus 604. In one embodiment, this location information may be used to authorize the user to access a specific sensitive document.

In one or more embodiments, the computerized system 600 may additionally include a communication interface, such as a network interface 605 coupled to the data bus 604. The network interface 605 may be configured to establish a connection between the computerized system 600 and the Internet 624 using at least one of WIFI interface 607 and the cellular network (GSM or CDMA) adaptor 608. The network interface 605 may be configured to provide a two-way data communication between the computerized system 600 and the Internet 624. The WIFI interface 607 may operate in compliance with 802.11a, 802.11b, 802.11g and/or 802.11n protocols as well as Bluetooth protocol well known to persons of ordinary skill in the art. In an exemplary implementation, the WIFI interface 607 and the cellular network (GSM or CDMA) adaptor 608 send and receive electrical or electromagnetic signals that carry digital data streams representing various types of information.

In one or more embodiments, the Internet 624 typically provides data communication through one or more sub-networks to other network resources. Thus, the computerized system 600 is capable of accessing a variety of network resources located anywhere on the Internet 624, such as web servers, other content servers as well as other network data storage resources. In one or more embodiments, the computerized system 600 is configured to send and receive messages, media and other data, including application program code, through a variety of network(s) including Internet 624 by means of the network interface 605. In the Internet example, when the computerized system 600 acts as a network client, it may request code or data for an application program executing on the computerized system 600. Similarly, it may act as a network server and send various data or computer code to other network resources.

In one or more embodiments, the computerized system 600 uses the network interface 605 to send request(s), via the Internet 624, such as HTTP requests, to the servers 110 and receive various information, including, without limitation, the aforesaid information displayed to the user using the user interface shown in FIG. 4.

In one or more embodiments, the functionality described herein is implemented by computerized system 600 in response to processor 601 executing one or more sequences of one or more instructions contained in the memory 612. Such instructions may be read into the memory 612 from another computer-readable medium. Execution of the sequences of instructions contained in the memory 612 causes the processor 601 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and/or software.

The term "computer-readable medium" as used herein refers to any medium that participates in providing instructions to processor 601 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 901 for execution. For example, the instructions may initially be carried on a magnetic disk from a remote computer. Alternatively, a remote computer can load the instructions into its dynamic memory and send the instructions over the Internet 624. Specifically, the computer instructions may be downloaded into the memory 612 of the computerized system 600 from the foresaid remote computer via the Internet 624 using a variety of network data communication protocols well known in the art.

In one or more embodiments, the memory 612 of the computerized system 600 may store any of the following software programs, applications or modules:

1. Operating system (OS) 613, which may be a mobile operating system for implementing basic system services and managing various hardware components of the computerized system 600. Exemplary embodiments of the operating system 613 are well known to persons of skill in the art, and may include Mac OS, iOS, Android, Windows, Windows Mobile, Linux, Unix or any other now known or later developed operating system(s).

2. Applications 614 may include, for example, a set of software applications executed by the processor 601 of the computerized system 600, which cause the computerized system 600 to perform certain predetermined functions, such as generate the graphical user interface screen shown in FIG. 4. In one or more embodiments, the applications 614 may include, for example, the Android applications 511, the XIP platform 504 and/or web browser application 615.

3. Data storage 616 may be used, for example, for storing logged sensitive information audit trail data 617 as well as other suitable statistical information.

Figure 7:
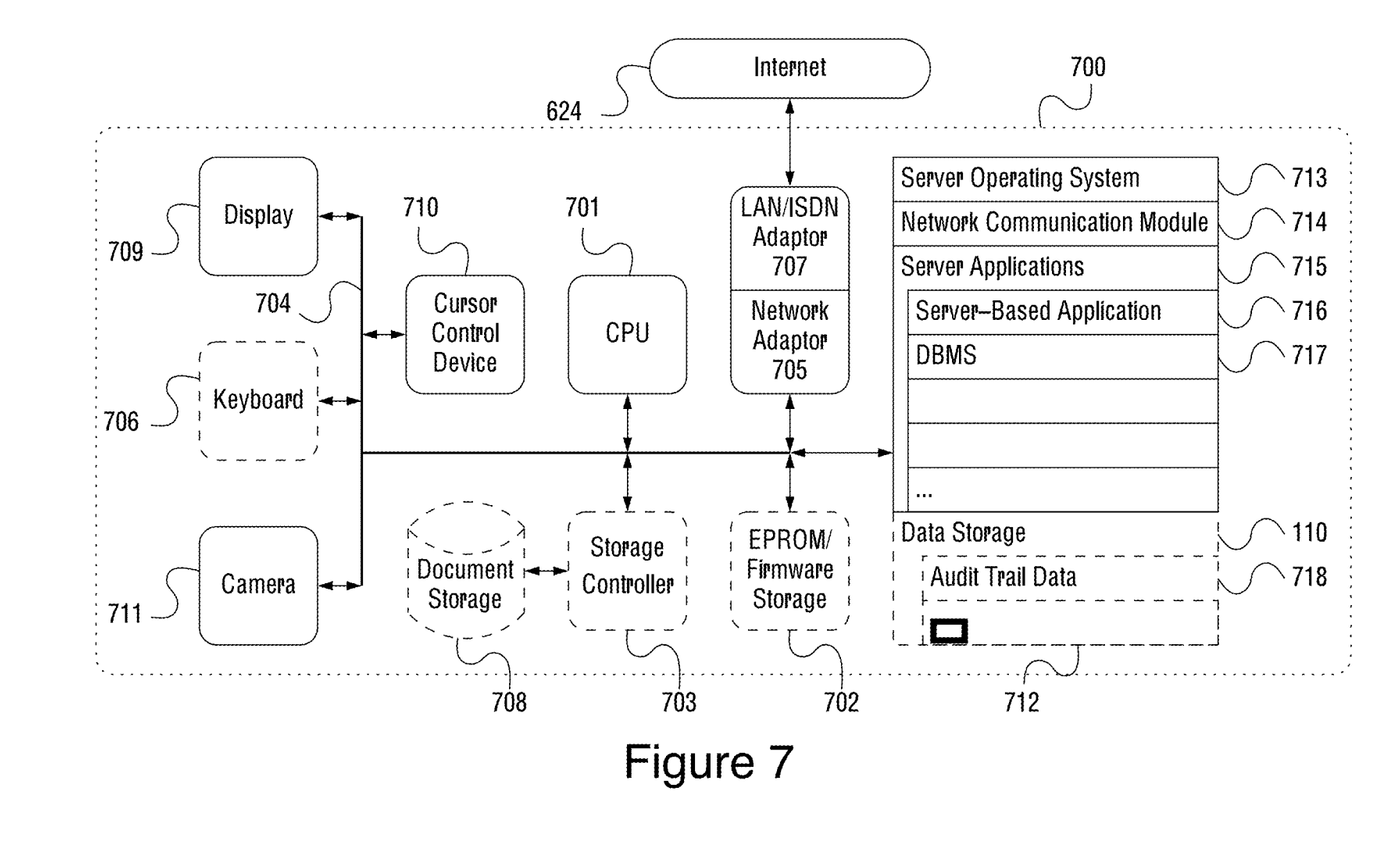
FIG. 7 illustrates an exemplary embodiment of a computerized server system, which could be used, for example, as the cloud server of the system for preserving and managing an audit trail associated with printing of sensitive documents shown in FIG. 1.

FIG. 7 illustrates an exemplary embodiment of a computerized server system 700 which could be used, for example, as the cloud server 110 of the system 100 for preserving and managing an audit trail associated with printing of sensitive documents shown in FIG. 1.

In one or more embodiments, the computerized server system 700 may incorporate a data bus 704, which may be substantially similar and may perform substantially similar functions as the data bus 704 of the computerized system 600 illustrated in FIG. 6. In various embodiments, the data bus 704 may use the same or different interconnect and/or communication protocol as the data bus 604. The one or more processors (CPUs) 701, the network adaptor 705, the EPROM/Firmware storage 702, the display device 709 and the keyboard 706 of the computerized server system 700 may be likewise substantially similar to the respective processor 601, the network interface 605, the EPROM/Firmware storage 602, the display device 609 and the keyboard 606 of the computerized system 600, except that the former components are deployed in a server platform configuration. In various implementations, the one or more processor 701 may have substantially increased processing power as compared with the processor 601.

In addition to the input device 706 (keyboard), the computerized server system 700 may additionally include a cursor control device 710, such as a mouse, a trackball, or cursor direction keys for communicating direction information and command selections to processor 701 and for controlling cursor movement on the display device 709. This input device typically has two degrees of freedom in two axes, a first axis (e.g., x) and a second axis (e.g., y), that allows the device to specify positions in a plane.

The LAN/ISDN adaptor 707 of the computerized server system 700 may be implemented, for example, using an integrated services digital network (ISDN) card or a modem to provide a data communication connection to a corresponding type of telephone line, which is interfaced with the Internet 624 using Internet service provider's hardware (not shown). As another example, the LAN/ISDN adaptor 707 may be a local area network interface card (LAN NIC) to provide a data communication connection to a compatible LAN and the Internet 624. To store various data files, the computerized server system 700 may be provided with document storage 708, for storing sensitive documents as well as the associated audit data by means of a storage controller 703. The camera 711 may be used to acquire images and/or video of various objects.

In one or more embodiments, the memory 712 of the computerized server system 700 may store any of the following software programs, applications, modules and/or data:

1. A server operating system (OS) 713, which may be an operating system for implementing basic system services and managing various hardware components of the computerized server system 700. Exemplary embodiments of the server operating system 713 are all well known to persons of skill in the art, and may include Windows Server, Mac OS, Unix, AIX, FreeBSD, Linux, as well as any now known or later developed operating systems.

2. A network communication module 714 may incorporate, for example, one or more network protocol stacks which are used to establish a networking connection between the computerized server system 700 and the various network entities of the Internet 624, such as the computerized mobile system 600, using the network adaptor 705 working in conjunction with the LAN/ISDN adaptor 707.

3. Server applications 715 may include, for example, a set of software applications executed by one or more processors 701 of the computerized server system 700, which cause the computerized server system 700 to perform certain predetermined functions or tasks. In one or more embodiments, the server applications 715 may include the server-based application 716, the functionality of which was described in detail above. Additionally provided may be a database management system 717 for storing and managing access to various information, as described in detail above, such as sensitive documents printing audit trail.

4. Data storage 110 (see also FIG. 1) may be used, for example, for storing the aforesaid information, including the sensitive documents printing audit trail 718, which may be stored in a form of one or more database tables, such as relational database tables, containing database records.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, Android as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in various systems and methods for preserving and managing an audit trail associated with printing of sensitive documents. It is intended that the specification and examples be considered as exemplary only, with a true scope and spirit of the invention being indicated by the following claims.

What is claimed is:

1. A computerized system for preserving and managing an audit trail associated with printing of a sensitive document, the system comprising:
 a. a printing device disposed on a local area network;
 b. a network-connected appliance disposed on the local area network and communicatively coupled to the printing device, the network-connected appliance configured to receive, via the local area network, a request from a client computer, directly accessible by an end user, the client computer comprising at least a processor and a memory and being separate and distinct from the network-connected appliance, for printing of the sensitive document, to log information related to the received printing request and to release the sensitive document to the printing device for printing; and
 c. a server disposed outside of the local area network and configured to receive from the network-connected appliance the logged information related to the printing request and to aggregate and store the logged information on a storage device for subsequent search and retrieval.

2. The computerized system of claim 1, wherein the server is further configured to receive logged information related to printing of sensitive documents from a plurality of network-connected appliances disposed on a plurality of different and distinct local area networks.

3. The computerized system of claim 1, wherein the server is further configured to generate a graphical user interface for searching and retrieval of the logged information related to the printing requests.

4. The computerized system of claim 3, wherein the server further comprises a web server portion and wherein the graphical user interface for searching and retrieval of the logged information related to the printing requests is a web user interface generated using the web server portion of the server.

5. The computerized system of claim 3, wherein the graphical user interface comprises a search portion for searching logged information related to printing requests related to a specified user.

6. The computerized system of claim 3, wherein the graphical user interface comprises a search portion for searching logged information related to printing requests related to a specified user location.

7. The computerized system of claim 3, wherein the graphical user interface comprises a search portion for searching logged information related to printing requests related to a specified request date and time.

8. The computerized system of claim 1, wherein the network-connected appliance further comprises a print server portion configured to handle the received printing request.

9. The computerized system of claim 1, wherein the server is a cloud-based server.

10. The computerized system of claim 1, wherein the network-connected appliance is further configured to encode the sensitive document with a serialized document code before releasing the sensitive document to the printing device for printing.

11. The computerized system of claim 10, wherein the serialized document code is a bar code.

12. The computerized system of claim 10, wherein the serialized document code is a QR-code.

13. The computerized system of claim 10, wherein the serialized document code is a steganographic code encoded within the body of the sensitive document.

14. The computerized system of claim 13, wherein the serialized document code is encoded using a character alignment, size, angle of rotation or spacing within the body of the sensitive document.

15. The computerized system of claim 1, wherein the information related to the received printing request comprises identity of the end user who initiated the printing request.

16. The computerized system of claim 1, wherein the information related to the received printing request comprises location of the end user who initiated the printing request.

17. The computerized system of claim 1, wherein the information related to the received printing request comprises date and time when the printing request was initiated.

18. The computerized system of claim 1, wherein the information related to the received printing request comprises identity of the sensitive document.

19. The computerized system of claim 1, wherein the information related to the received printing request comprises information on the printing device.

20. The computerized system of claim 1, wherein the network-connected appliance further comprises a smart card reader configured to read information encoded on a smart card inserted by the end user and wherein the network-connected appliance is further configured to authenticate the end user based on the read information.

21. A computer-implemented method for preserving and managing an audit trail associated with printing of a sensitive document, the method being performed in a computerized system comprising a printing device disposed on a local area network, a network-connected appliance disposed on the local area network and communicatively coupled to the printing device and a server disposed outside of the local area network, the method comprising:
  a. receiving, at the network-connected appliance disposed on the local area network, a request from a client device, computer, directly accessible by an end user, the client computer comprising at least a processor and a memory and being separate and distinct from the network-connected appliance, for printing of the sensitive document, wherein the request is received by the network-connected appliance from the client device computer via the local area network;
  b. logging, at the network-connected appliance, information related to the received printing request;
  c. releasing, by the network-connected appliance, the sensitive document to the printing device for printing;
  d. transmitting the logged information related to the received printing request from the network-connected appliance to the server disposed outside of the local area network; and
  e. aggregating and storing, by the server, the transmitted logged information on a storage device for subsequent search and retrieval.

22. A non-transitory computer-readable medium embodying a set of computer-executable instructions, which, when executed in connection with a computerized system comprising a printing device disposed on a local area network, a network-connected appliance disposed on the local area network and communicatively coupled to the printing device and a server disposed outside of the local area network, cause the computerized system to perform a method comprising:
  a. receiving, at the network-connected appliance disposed on the local area network, a request from a client device, computer, directly accessible by an end user, the client computer comprising at least a processor and a memory and being separate and distinct from the network-connected appliance, for printing of the sensitive document, wherein the request is received by the network-connected appliance from the client device computer via the local area network;
  b. logging, at the network-connected appliance, information related to the received printing request;
  c. releasing, by the network-connected appliance, the sensitive document to the printing device for printing;
  d. transmitting the logged information related to the received printing request from the network-connected appliance to the server disposed outside of the local area network; and
  e. aggregating and storing, by the server, the transmitted logged information on a storage device for subsequent search and retrieval.

* * * * *